Oct. 2, 1934.   E. C. SPARLING   1,975,180

COURSE RECORDER

Original Filed Dec. 15, 1928   2 Sheets-Sheet 1

INVENTOR
Eric C. Sparling
BY Herbert H. Thompson
his ATTORNEY.

Oct. 2, 1934.  E. C. SPARLING.  1,975,180
COURSE RECORDER
Original Filed Dec. 15, 1928   2 Sheets-Sheet 2
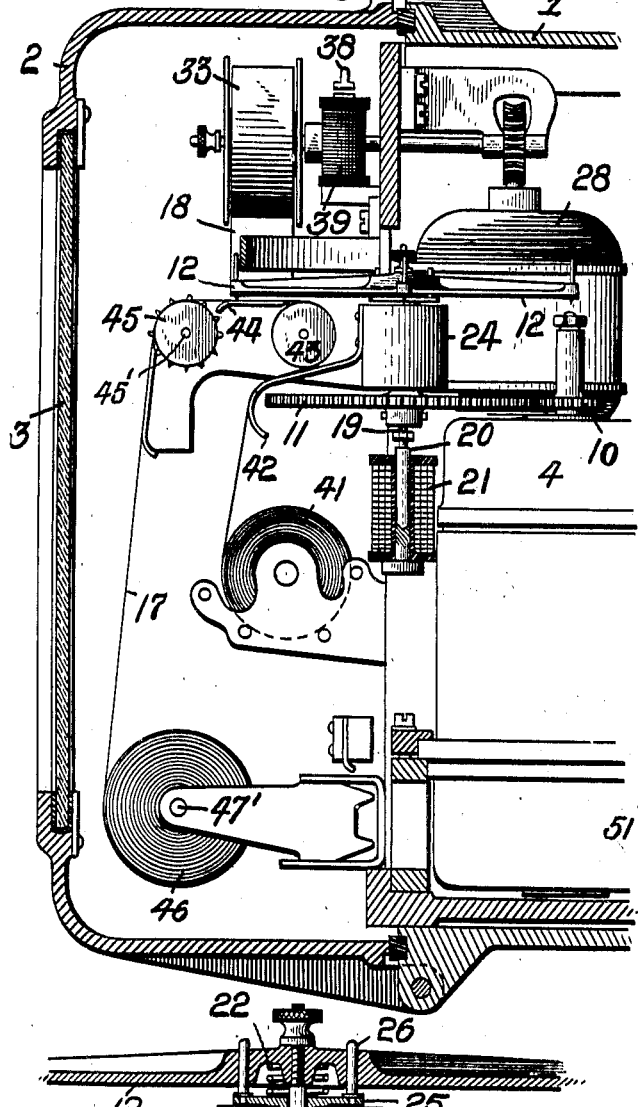
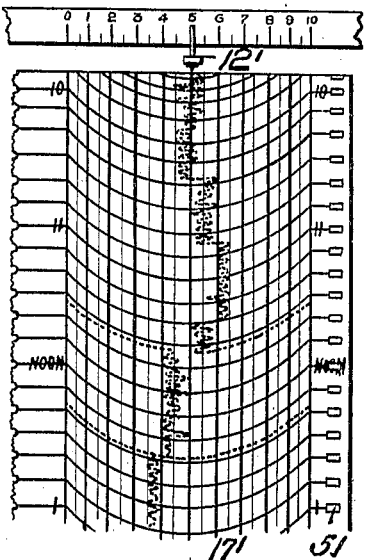
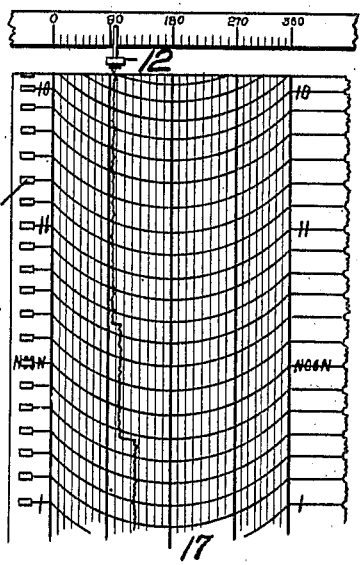
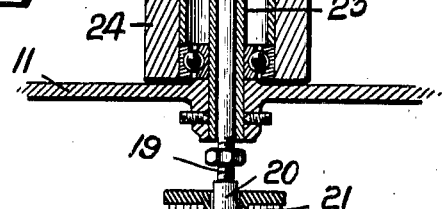
INVENTOR
Eric C. Sparling
BY
Herbert H. Thompson
his ATTORNEY.

Patented Oct. 2, 1934

1,975,180

UNITED STATES PATENT OFFICE 1,975,180

COURSE RECORDER

Eric C. Sparling, Garden City, N. Y., assignor, by mesne assignments, to Sperry Gyroscope Company, Inc., Brooklyn, N. Y., a corporation of New York Application December 15, 1928, Serial No. 326,307
Renewed January 6, 1934

8 Claims. (Cl. 234—26.5)

This invention relates to course recorders for ships or other dirigible vehicles, more particularly to the type in which a single width of the accurate or fine reading chart represents less than a complete turn of the ship. One such course indicator is illustrated in the patent to Elmer A. Sperry No. 1,850,978 dated March 22, 1932 for Improvements in recorders for ships. Such recorders, however, are usually driven by a single repeater motor which revolves a plurality of times for a revolution of the compass. The result was, if the repeater motor at the recorder for any reason fell out of step with the compass transmitter, that synchronism would be lost and the device would be incorrect until reset manually.

The purpose of the present invention is to devise an accurate course indicator having a fine reading chart, the width of which represents only a small fraction of the complete turn of the vessel, in combination with a main course recording chart which shows the true course, but on a small scale, the two being read together and both markers being self-synchronous with the compass so that loss of synchronism cannot occur as long as the device is operating. My device accordingly incorporates a plurality of repeater motors, preferably of the A. C. synchronous type, one of which is driven at a one-to-one ratio with the compass and another at a multiple ratio, say 36 to 1. Each motor actuates a separate pen recording on a suitable chart, the width of the chart for the first pen 360° and the width of the other portion in the illustration given representing but 10°. The coarse chart can then be read to the nearest tens of degrees and the fine chart to the closest degree or fraction thereof.

Referring to the drawings in which the preferred form of the invention is illustrated;

Fig. 3 is an enlarged vertical section through the case taken at right angles to the section in Fig. 2.

Fig. 4 is a sectional detail showing the means for actuating the marking pens periodically.

Fig. 5 is a view showing the fine portion of the chart and Fig. 6 showing the coarse portion of the chart, each having a typical record thereon.

Figure 7:
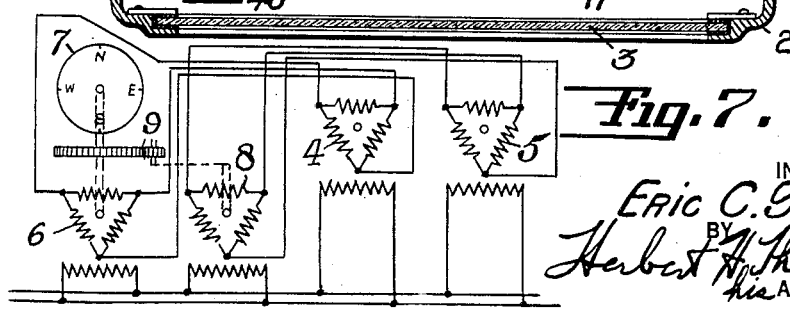
Fig. 7 is a wiring diagram showing the connections from the master compass transmitters to the repeater motors in the recording instrument.

The device is shown as enclosed within a casing 1, which may be bolted to the wall and is provided with a removable cover 2 having a transparent front 3. Within said casing are mounted a plurality of repeater motors 4 and 5, motor 4 in this instance being the coarse motor actuated from transmitter 6 on the compass 7 (Fig. 7), which is connected thereto at a one-to-one ratio, and the motor 5 being the high speed fine motor actuated from the transmitter 8 which is driven through suitable gearing 9 on the compass at any suitable ratio, say 36 to 1. Each motor is shown as geared through pinion 10 and larger gear 11 to a spider 12 which is shown as carrying on the arms thereof a plurality of marking pens or points 13—14—15—16. Four pens are shown spaced 90° apart and the gearing 10 and 11 is such that each pen will traverse the full 90° for one complete revolution of the motor 4, (i. e. 1:4) so that the travel of the pen across the chart 17 represents a full turn of 360° of the ship. As one pen goes off the chart the next pen comes on at the opposite edge. It will be understood that, if more pens are employed, a correspondingly higher gear reduction is employed, and if a less number of pens is employed a lower reduction. Motor 5 is likewise connected by similar gearing 10', 11' to a similar spider 12', so that one movement of a pen on this spider across the adjoining chart 17' represents a 10° turn of the ship. It will be understood that these ratios given are merely for the purpose of illustrating a convenient ratio to employ between the coarse and fine recorders and that any desirable ratio or a plurality of ratios may be employed if desired.

Preferably the marking devices are in the form of metallic points with an inking device, such as a typewriter ribbon 18 placed between the points and the chart. The spider and markers are normally maintained above the ribbon but are periodically depressed to make a mark on the chart. For this purpose the spider is shown as mounted on a shaft 19 secured to the core 20 of a solenoid 21, the stem and spider normally being maintained elevated by means of compression spring 22. The driving gear 11 is shown as secured to a sleeve 23 loosely surrounding stem 19 and journaled in fixed hub 24. At its upper end said sleeve is shown as having a collar 25 from which extends pins 26 which pass through holes in the hub of the spider thus providing a driving connection between the gear 11 and the spider but permitting the spider to have an up-and-down movement with respect thereto.

For periodically depressing the pens I have shown a make-and-break contact device 27 driven from a small motor 28. As shown, the motor drives through worm gearing 29 a cam 30 on which bears spring arm 31 of the contact device 27 so that contact is made once every revolution of the cam 30. Said contact is shown as placed in circuit with the solenoids 21, 21' so that the solenoids are given momentary excitation to depress marking spiders 12 and 12' and make dots on the chart every time the cam revolves. Since the normal rate of advance of the chart compared to rate of movement of the ship is slow, the dots will practically form a continuous line on the coarse chart 17 (Fig. 6) but will appear as dotted lines on the fine chart 17' (Fig. 5).

Figure 1:
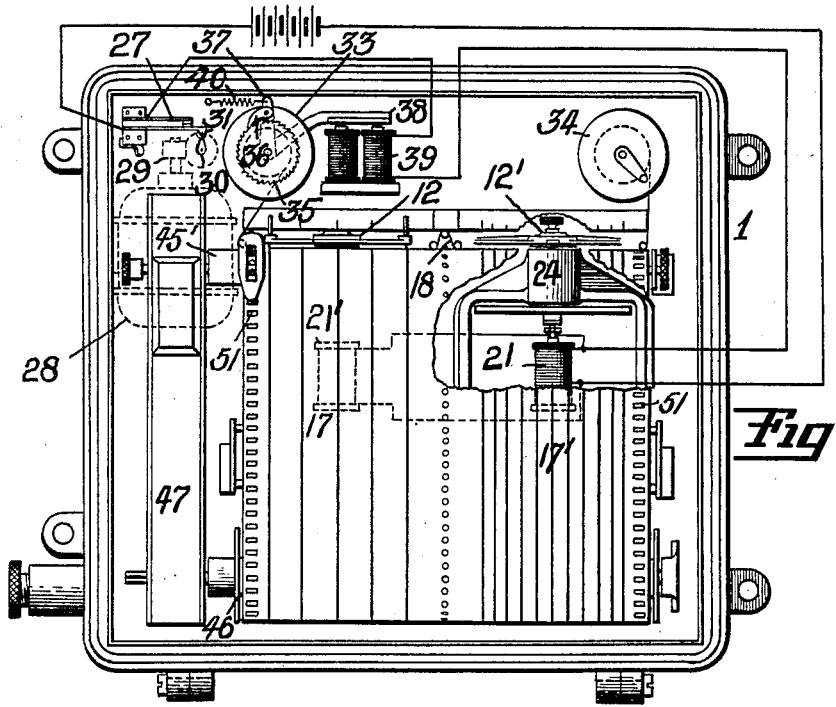
Fig. 1 is a front elevation, with the cover removed, of my recording instrument.
Figure 2:
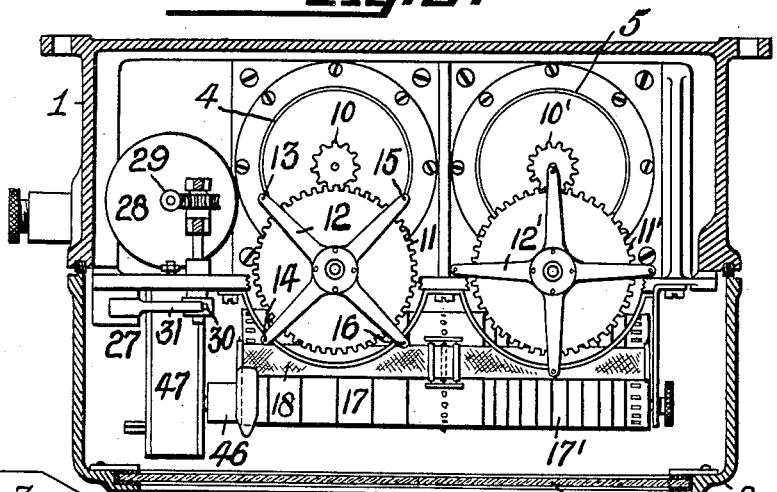
Fig. 2 is a horizontal section through the upper portion of the instrument.

I also prefer to feed the typewriter ribbon periodically and preferably at the time when the pens are not pressing thereon. The ribbon is shown as carried by two rolls 33—34. On the shaft of one of the rolls is placed a ratchet wheel 35 with which cooperates a pawl 36 on a bell crank lever 37. The other arm of said lever acts on armature 38 of electro-magnet 39, so that when the electro-magnet 39 is excited the pawl is drawn to the right in Fig. 1 thus sliding over the teeth and when the electro-magnet is deenergized the spring 40 pulls the arm a notch to the left, thus advancing the ratchet wheel to feed the ribbon. By placing the electro-magnet in the same circuit with the solenoid, it will thus be seen that the ribbon is advanced when the pens are not pressing on the same.

While the chart may be advanced in accordance with the speed of the ship, it is usual to advance such charts by clockwork or any timing device, since the normal cruising speed of the ship is comparatively constant. The two charts may be on one sheet of paper and thus advanced together by the same mechanism. In loading, a roll of paper is inserted as shown at 41 (Fig. 3), the chart passing up over guide 42, roller 43, across the platen 44 and under the marking pens, around timing roller 45, having driving pins 50 thereon which take in holes 51 in the edges of the paper. From thence the paper goes down behind the window 3 and over the rewinding drum 46. As stated, these rollers are preferably driven by clockwork, which is enclosed within casing 47. The escapement mechanism is connected to roller 45 through shaft 45' and the spring drive is directly connected through shaft 47' to the drum 46 so that a constant speed is imparted to the chart in spite of the varying size of the roll 46. The transverse graduations on the chart represent time intervals and the longitudinal graduations on the coarse portion of the chart represent tens of degrees and on the fine portion half degrees or 30 minutes. In reading the chart the observer reads the two together. Thus at noon the ship's heading as shown by the coarse chart is between 100 and 110 degrees, while the fine chart shows the heading was 4.5 degrees, so that the reading of the two together is 104.5 degrees.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a self-synchronous course recorder for ships, the combination with the compass, of a repeater motor driven one-to-one from the compass, a second repeater motor driven at a multiple speed from the compass, conjointly readable charts having coarse and fine fixed markings showing respectively a complete turn and a fraction thereof, and a marking pen actuated by each motor so as to be moved completely across its chart for one complete revolution of its connected motor and adapted to record the course on the respective charts.

2. In a self-synchronous course recorder for ships, the combination with the compass, of a traveling two-part chart, a plurality of markers cooperating therewith one for each part, a repeater motor operated from said compass a plurality of times per turn of the ship, one of said markers being driven therefrom a plurality of times across its part of the chart per turn of the ship, a second repeater motor operated synchronously from said compass a single turn per turn of the ship, another of said markers being driven therefrom across its part of the chart a single time per turn of the ship.

3. In a course recorder for ships, the combination with a repeater motor driven at a one-to-one ratio from the compass, a plurality of equidistant, revoluble markers, means for rotating said markers from said motor at a speed varying as an inverse ratio to the number of markers, and a recording chart so arranged that only one marker is recording thereon at a time.

4. In a course recorder for ships, the combination with a repeater motor driven at a one-to-one ratio from the compass, a plurality of equidistant, revoluble markers, means for rotating said markers from said motor at a speed varying as an inverse ratio to the number of markers, a recording chart so arranged that only one marker is recording thereon at a time, an inking ribbon between the chart and the recording marker only, and means for periodically depressing the markers to record the position of the recording marker thereon.

5. In a course recorder for vessels having a multiple reading chart having on one part thereof complete circle coarse markings and on the other part thereof a small fraction of a circle markings representing finer graduations, means for recording on the first named part a line representing the approximate course of the vessel on a small scale, and independent means for recording on the second named part a second line representing the precise location of the coarse line to a degree or fraction thereof.

6. In a course recorder for ships, the combination with a traveling chart, of a marking carriage mounted above the chart and having a plurality of spaced marking members thereon, one only of which lies over the chart at any one time, a repeater motor, reduction gearing connecting said motor and carriage for rotating said carriage at an inverse speed to the number of markers thereon, and means for periodically depressing said carriage to make a series of marks on the chart.

7. The combination with a course recorder for ships having upper and lower chart rollers, means for feeding the chart from one to the other across the face of the recorder so that a substantial length of the chart is visible and means for leading the chart rearwardly from one of said rollers providing a short exposed strip, of a rotatable marking carriage pivoted to the rear of and above said exposed strip on an axis perpendicular to said strip and having a plurality of radially disposed markers, a narrow inking ribbon extending across said strip, only one of said markers overlying said ribbon at a time, and means for periodically depressing said carriage.

8. The combination with a course recorder for ships having upper and lower chart rollers, means for feeding the chart from one to the other across the face of the recorder so that a substantial length of the chart is visible and means for leading the chart rearwardly from one of said rollers providing a short exposed strip, of a flat supporting surface under said strip, a rotatable marking carriage pivoted to the rear of and above said exposed strip on an axis perpendicular to said strip and having a plurality of radially disposed markers, a narrow inking ribbon extending across said strip, only one of said markers overlying said ribbon at a time, and means for periodically depressing said carriage.

ERIC C. SPARLING.